(12) United States Patent
Caldas et al.

(10) Patent No.: US 8,945,337 B2
(45) Date of Patent: Feb. 3, 2015

(54) METHOD TO PRODUCE A SURFACE COVERING

(75) Inventors: Victor Caldas, Cowansville (CA);
Daniel Tremblay, Cowansville (CA);
Marcus Hyde, Florence, AL (US);
Jean-François Courtoy, St. Bruno (CA)

(73) Assignee: Tarkett Inc., Farnham, Quebec (CA)

( * ) Notice: Subject to any disclaimer, the term of this patent is extended or adjusted under 35 U.S.C. 154(b) by 1188 days.

(21) Appl. No.: 12/474,485

(22) Filed: May 29, 2009

(65) Prior Publication Data

US 2010/0300609 A1 Dec. 2, 2010

(51) Int. Cl.
| | | |
|---|---|---|
| B29C 65/00 | (2006.01) | |
| B32B 37/00 | (2006.01) | |
| C08J 5/00 | (2006.01) | |
| B31B 1/60 | (2006.01) | |
| H05K 13/04 | (2006.01) | |
| B32B 38/04 | (2006.01) | |
| B29C 70/52 | (2006.01) | |
| C09J 5/02 | (2006.01) | |
| B32B 3/02 | (2006.01) | |
| B32B 33/00 | (2006.01) | |
| D03D 27/00 | (2006.01) | |
| D04H 11/00 | (2006.01) | |
| D05C 17/00 | (2006.01) | |

(Continued)

(52) U.S. Cl.
CPC ......... *C08L 23/0876* (2013.01); *C08L 2205/03* (2013.01); *C08L 2205/06* (2013.01)
USPC .......... 156/308.2; 156/60; 156/296; 156/297; 156/250; 156/275.5; 156/166; 156/182; 156/324.4; 428/95; 428/500; 428/457; 428/323; 428/444; 264/245; 264/75; 264/142

(58) Field of Classification Search
USPC .............. 428/95, 500, 457, 323, 444; 156/60, 156/296, 297, 308.2, 250, 275.5, 166, 182, 156/324.4; 264/245, 75, 142
See application file for complete search history.

(56) References Cited

U.S. PATENT DOCUMENTS

| | | | |
|---|---|---|---|
| 4,083,824 A | | 4/1978 | Harris |
| 4,379,190 A | * | 4/1983 | Schenck .......................... 428/95 |
| 5,244,942 A | * | 9/1993 | Hover et al. .................. 523/171 |
| 5,728,476 A | * | 3/1998 | Harwood et al. ............. 428/500 |
| 7,052,771 B2 | * | 5/2006 | Nieminen ..................... 428/457 |
| 7,094,715 B2 | | 8/2006 | Sakaguchi et al. |
| 7,175,904 B2 | * | 2/2007 | Oshilaja et al. ............... 428/323 |
| 2005/0074622 A1 | | 4/2005 | Vogel et al. |

(Continued)

FOREIGN PATENT DOCUMENTS

| | | |
|---|---|---|
| BE | 1004795 A3 | 2/1993 |
| WO | WO 92/19562 A1 | 11/1992 |
| WO | WO 2008/042387 A2 | 4/2008 |

*Primary Examiner* — Richard Crispino
*Assistant Examiner* — Matthew Hoover
(74) *Attorney, Agent, or Firm* — Reinhart Boerner Van Deuren P.C.

(57) ABSTRACT

The present invention relates to a method to produce a polymeric sheet comprising the steps of providing an acid-based polymer, providing a neutralizing agent, the neutralizing agent being selected from the group consisting of an organic metallic compound, a metallic salt of a fatty acid, and an ionomer, or a mixture thereof, providing a processing oil, mixing said acid-based polymer, said neutralizing agent, said processing oil, to obtain a polymeric composition, and processing said polymeric composition to form a polymeric sheet. The polymeric sheet may be used as a component, or as a substrate, of a surface covering. The polymeric sheet may also be used to form polymeric particles which are component of so-called "homogenous", or substrate-free, surface covering.

12 Claims, 1 Drawing Sheet

| (51) | Int. Cl. | |
|---|---|---|
| | B32B 27/00 | (2006.01) |
| | B32B 15/04 | (2006.01) |
| | B32B 5/16 | (2006.01) |
| | B29C 39/12 | (2006.01) |
| | B29C 47/00 | (2006.01) |
| | B29B 9/06 | (2006.01) |
| | C08L 23/08 | (2006.01) |

(56) References Cited

U.S. PATENT DOCUMENTS

| 2005/0186440 A1 | 8/2005 | Hausmann et al. |
| 2008/0081875 A1 | 4/2008 | Tian et al. |
| 2008/0081882 A1 * | 4/2008 | Tian et al. .................. 525/444 |
| 2009/0197108 A1 | 8/2009 | Oshilaja et al. |

* cited by examiner

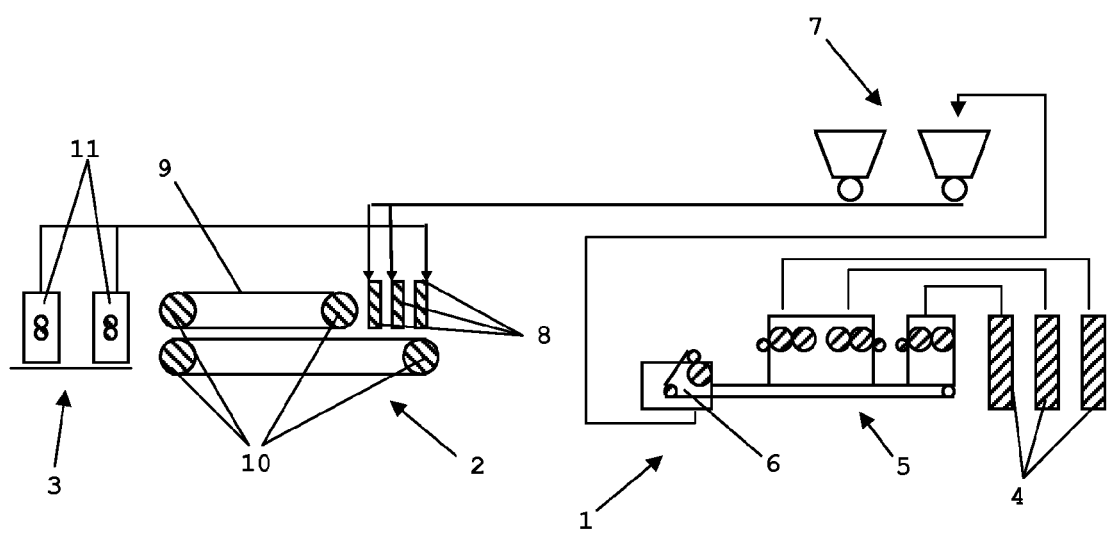

METHOD TO PRODUCE A SURFACE COVERING

FIELD OF THE INVENTION

The present invention relates to a method to produce a polymeric sheet, and in particular a polymeric surface covering, for example a floor covering.

PRIOR ART AND RELATED TECHNICAL BACKGROUND

Surface coverings, especially PVC-based surface coverings, are widely used to decorate buildings or houses surfaces as they are more pleasant, more aesthetic and more comfortable than a surface just painted.

However due to environmental issues on PVC coverings regarding VOC (Volatile Organic Compounds) release, plasticizers and thermal stabilizers toxicity, efforts on PVC alternatives were developed.

Rubber based or linoleum based surface coverings are PVC alternatives. However, such covering present the drawback of having an unpleasant odour and a lower mechanical resistance, or flexibility, as a PVC surface covering. Furthermore, Rubber or linoleum based surface coverings are not able to be processed on standard equipment used to process PVC surface coverings.

To respond to environmental constraints, it has been suggested, as described in WO 2008/042387, to replace the plasticizers by a high molecular weight thermoplastic polyester resin or a highly viscous polyester resin. It has also been suggested, to replace the PVC resin by acid modified polymers, as described in U.S. Pat. No. 7,175,904, in which the flooring substrate has a PVC-free composition comprising a terpolymer and a copolymer, the terpolymer comprising ethylene, methyl acrylate and acrylic acid, and the copolymer comprising ethylene and methacrylic acid.

However, a composition comprising acid modified polymers and a significant amount of fillers, 75 to 85% for example, is difficult to be calendered into a thin sheet, and the extractability of the sheet from a hot calender device is a critical issue. Furthermore, such composition lacks in hot tensile strength.

AIMS OF THE INVENTION

The present invention aims to provide a method to produce a polymeric sheet, preferably a surface covering which does not have the drawbacks of the prior art.

The invention provides a method to produce a polymeric surface covering which is an alternative to traditional PVC surface coverings.

The invention provides a method to produce a polymeric surface covering on a standard PVC processing equipment.

The invention aims to provide a less expensive alternative to rubber and linoleum surface covering, with less environmental negative impacts when performing a LCA (Life Cycle Assessment), with low maintenance costs.

SUMMARY OF THE INVENTION

The present invention discloses a method of producing a polymeric sheet, preferably a multiple layers polymeric surface covering comprising said polymeric sheet, and a method of producing a so-called "homogenous" surface covering comprising polymeric particles obtained by granulating said polymeric sheet, and by depositing said particles on a band-shape moving carrier or on a polymeric sheet identical to the polymeric sheet used to form said particles.

A preferred surface covering is a floor covering.

The method to produce the polymeric sheet, the method to produce the multiple layers polymeric surface covering, and the method to produce the so-called "homogenous" surface covering, comprise the steps of providing an acid-based polymer, providing a neutralizing agent selected from the group consisting of an organic metallic compound, a metallic salt of a fatty acid, and an ionomer, or a mixture thereof, providing a processing additive, mixing said acid-based polymer, said neutralizing agent and said processing additive, to obtain a polymeric composition, and processing said polymeric composition to form a polymeric sheet, said polymeric sheet being used as a surface covering or as a component of a multiple layer surface covering or a component of a so called "homogenous" surface covering.

The neutralizing agent is an organic metallic compound selected from the group consisting of potassium hydroxide, aluminum hydroxide, calcium hydroxide, and zinc oxide, or a mixture thereof.

The neutralizing agent is a metallic salt of a fatty acid having between 8 and 28 atoms of carbon.

The neutralizing agent is a terpolymer of ethylene, butylacrylate and methacrylic acid, partially neutralised in the form of an ionomer.

The neutralizing agent is a mixture comprising a metallic salt of a fatty acid having between 8 and 28 atoms of carbon and an ionomer.

The processing additive is a mineral oil, a vegetable oil or a synthetic oil.

The synthetic or vegetable processing additive is selected from the group consisting of citrates, cyclohexane diesters, benzoates, adipates, phosphonates, polyethylene glycols, sunflower oil, linseed oil, and derivatives of castor oil, or a mixture thereof.

The acid modified polymer is an ethylene-co-acrylic acid polymer (EAA) or ethylene-co-methacrylic acid polymer (EMAA).

The methods may further comprise the steps of providing an additive being selected from the group consisting of a filler, a release agent, and a pigment, or a mixture thereof, and introducing said additive in the mixing step.

The processing of the polymeric composition, to form a polymeric sheet, is performed by calendering or by extrusion.

In some embodiments, the method further comprises the steps of granulating said polymeric sheet into polymeric particles, depositing said polymeric particles on a band-shape moving carrier, or a substrate, heating the polymeric particles on said band-shape moving carrier, pressing under heat the polymeric particles to form the polymeric surface covering.

In some embodiments, the method further comprises the steps of sanding the back of said polymeric surface covering, mechanically embossing the top of said surface covering, coating the top of said surface covering with a varnish layer.

In some embodiments, the method further comprises the steps of cutting the polymeric surface covering into tiles, and annealing said tiles.

The polymeric composition can be performed on a standard equipment used to produce vinyl-based surface coverings, and comprising for example hot mixing device, for example an FCM mixer, sheeting devices for example calender rolls, cooling device, an edge trimming device, a band-shape moving carrier, an annealing device, and devices to cut the surface covering into final shape.

SHORT DESCRIPTION OF THE DRAWINGS

FIG. 1 is a schematic representation of the production line to implement the method according to the invention.

DETAILED DESCRIPTION OF THE INVENTION

The present invention relates to a method to produce a polymeric sheet which is an element of a surface covering, in which the PVC and the phtalate plasticizers have been replaced by an acid-based polymer (homopolymer, copolymer or terpolymer). The surface covering is either a single polymeric sheet or a multiple layer surface covering comprising the polymeric sheet of the present invention. The surface covering can also be a so called "homogenous" surface covering, which is made of agglomerated and fused polymeric particles obtained by shredding the polymeric sheet.

The method according to the present invention, enables a significant improvement of the hot tensile strength of the polymeric sheet produced by the method according to the present invention, and an improvement of the extractability of such a sheet from the processing equipment, for example from the calender roll. This is achieved by the neutralisation of the acid of the acid-based polymer during the sheet manufacturing process.

It has been found that the partial or entire neutralisation of the acid groups of the acid-based polymer to form an ionomer generally lowers the polymeric sheet flexibility at room temperature. Consequently, it was possible to dose the neutralizing agent so as to attain the level of neutralisation necessary for the hot tensile strength that is required for the sheet extraction from the processing equipment and the sheet flexibility once the product is at room temperature.

By controlling the neutralisation level and the nature of the neutralizing agent, particularly by using an organic metallic compound, a metallic salt of a fatty acid, an acid-based polymer, a pre-neutralized acid-based polymer, or a mixture thereof, it is thus possible to adapt the level of neutralisation of the acid-based polymer to obtain the polymeric sheet with the required properties.

The acid-based polymer is a homopolymer of acrylic acid, methacrylic acid, or a co-polymer of acrylic acid and/or methacrylic acid and/or vinyl acetate, with ethylene or propylene. The acid-based copolymer may also be a terpolymer. The acid-based polymer is selected from the group consisting of acrylic acid polymer, (meth)acrylic acid polymer, ethylene-co-acrylic acid polymer (EAA), ethylene-co-methacrylic acid polymer (EMAA), ethylene-co-methyl-acrylic acid, ethylene-co-isobutyl-acrylic acid, ethylene-co-butyl-acrylic acid, ethylene-methyl methacrylic acid, ethylene-methacrylic acid-acrylic acid terpolymer (EMA-AA), ethylene-isobutyl-acrylic acid-methacrylic acid terpolymer, ethylene-isobutyl acrylic acid-methacrylic acid terpolymer, ethylene-butyl acrylic acid-methacrylic acid terpolymer, ethylene-isobutyl acrylic acid-acrylic acid ethylene-butyl acrylic acid-acrylic acid terpolymer, ethylene-vinyl acetate-methacrylic acid terpolymer, ethylene-vinyl acetate-acrylic acid terpolymer, ethylene-vinyl acetate-monoethyl maleic acid terpolymer, ethylene-methyl acrylate-monoethyl maleic acid, and a mixture thereof.

The acid-based polymer is a resin with a melt flow index, measured at 190° C. under 2.16 kg load, of between 10 and 60 g/10 min. Preferably, it has a melt flow index of around 10 to around 35 g/10 min at 190° C.

The neutralisation level directly impact the flexibility of the sheet, as shown in table 1, for compositions comprising for example an organic metallic compound as neutralisation agent. The maximum load (in psi) and the flexibility at break were assessed according to ASTM F1304.

TABLE 1

Effect of the neutralisation on the sheet properties. All the components are given in percentage in weight of the total weight of the polymeric composition. The "neutralisation level" is the theoretical percentage of the acid-based polymer further neutralisation achievable with respect to the neutralisation agent.

| | Compositions Neutralisation level | | | | | |
|---|---|---|---|---|---|---|
| | 0% | 20% | 35% | 50% | 65% | 100% |
| EAA | 10 | 9.98 | 9.97 | 9.95 | 9.94 | 9.90 |
| Neutralisation agent (Ca(OH)$_2$) | 0 | 0.20 | 0.35 | 0.50 | 0.65 | 1.00 |
| Filler (CaCO$_3$) | 90.00 | 89.82 | 89.68 | 89.55 | 89.41 | 89.10 |
| Properties | | | | | | |
| Sheet thickness (mils) | 130.33 | 130.00 | 129.25 | 131.00 | 132.25 | 135.67 |
| Max load at break(psi) | 8.85 | 8.54 | 8.95 | 10.68 | 12.02 | 15.56 |
| Flexibility (inches) | 1.83 | 1.82 | 1.72 | 1.35 | 1.06 | 0.69 |

As shown in Table 1, even if the filler, for example calcium carbonate in table 1, might participate somehow to the neutralisation of the acid-based polymer, EAA is generally able to accept a further certain level of neutralisation without loss of flexibility, for example a further theoretical percentage of between 35 and 50% (table 1). Beyond this point, the compound hardens and the flexibility decreases, while the hot tensile strength is improved with the neutralisation.

To get a compromise between the hot tensile strength and the flexibility required, the minimum flexibility being 1 inch according to ASTM F1066 section 8.1, the theoretical level of further neutralisation of the acid-based polymer should be between 25% and 75%, which may be reached by the use of a neutralizing agent.

The neutralizing agent is an organic metallic compound, a metallic salt of a fatty acid, an acid-based polymer partially or fully neutralised in the form of a ionomer, or a mixture thereof.

The neutralizing agent is an organic metallic compound selected from the group consisting of potassium hydroxide, aluminum hydroxide, calcium hydroxide, and zinc oxide, or a mixture thereof.

The organic metallic compound represents in weight between 0.2 and 1% wt of the total weight of the polymeric composition forming the polymeric sheet.

The neutralizing agent is a metallic salt of a fatty acid, preferably having between 8 and 28 atoms of carbon. The fatty acid salt has a high content of metal salt, preferably between 6 and 22% wt of salt.

Preferably, the neutralizing agent is an octoate, laurate, docosanoate, tetracosanoate or octacosanoate metallic salt, or a mixture thereof. The metallic salt is selected from the group consisting of Aluminum, Barium, Bismuth, Calcium, Cerium, Cobalt, Iron, Lead, Magnesium, Manganese, Nickel, Tin, Zinc, or Zirconium.

The metallic salt of the fatty acid represents in weight between 0.5 and 5% wt of the total weight of the polymeric composition forming the polymeric sheet.

The neutralizing agent is an acid-based polymer partially neutralised in the form of a ionomer. The neutralizing agent is a homopolymer of acrylic acid, methacrylic acid, or a copolymer of acrylic acid and/or methacrylic acid and/or vinyl acetate, with ethylene or propylene. The acid-based copolymer may be a terpolymer.

The neutralizing agent may be the ionomer form of an acid-based polymer selected from the group consisting of acrylic acid polymer, (meth)acrylic acid polymer, ethylene-co-acrylic acid polymer (EAA), ethylene-co-methacrylic acid polymer (EMAA), ethylene-co-methyl-acrylic acid, ethylene-co-isobutyl-acrylic acid, ethylene-co-butyl-acrylic acid, ethylene-methyl methacrylic acid, ethylene-methacrylic acid-acrylic acid terpolymer (EMA-AA), ethylene-isobutyl-acrylic acid-methacrylic acid terpolymer, ethylene-isobutyl acrylic acid-methacrylic acid terpolymer, ethylene-butyl acrylic acid-methacrylic acid terpolymer, ethylene-isobutyl acrylic acid-acrylic acid ethylene-butyl acrylic acid-acrylic acid terpolymer, ethylene-vinyl acetate-methacrylic acid terpolymer, ethylene-vinyl acetate-acrylic acid terpolymer, ethylene-vinyl acetate-monoethyl maleic acid terpolymer, ethylene-methyl acrylate-monoethyl maleic acid, and a mixture thereof.

Preferably, the neutralizing agent is the ionomer form of EAA, or the ionomer form of a terpolymer of ethylene, butylacrylate and methacrylic acid, which is partially neutralised with Zn ions.

The level of neutralisation in the pre-neutralised acid-based copolymer needs to be higher than required in the final compound as the neutralisation present on the pre-neutralised polymer migrates onto the acid-based polymer causing an averaging of the neutralisation level. If the neutralisation level in the ionomer is insufficient, it is possible to increase said neutralisation level through the use of the other neutralising agent, for example another pre-neutralised polymer, or an organic metallic compound, a metallic salt of a fatty acid, or a mixture thereof.

The pre-neutralised polymer is a resin with a melt flow index, measured at 190° C. under 2.16 kg load, of between 1 and 10 g/10 min. Preferably it has a melt flow index of around 1 g/10 min.

The pre-neutralised acid-based copolymer represents in weight between 5 and 17% wt of the total weight of the polymeric composition forming the polymeric sheet.

In the process according to the present invention, the acid-based polymer and the neutralizing agent are mixed and melted together to obtain a neutralized acid-based polymer, the neutralisation occurring during the mixing, and the level of neutralisation being such as it enables to obtain the hot tensile strength required to extract the thin sheet from the hot calenders.

The mixing is performed by any suitable device for example in a mixer such as an Farrel continuous mixer (FCM), developing a drop temperature between 350 and 420° F. If the neutralising agent is based on a low molecular weight fatty acid (such as octoate), the gas generated during the neutralisation process (octanoic acid) is captured by any suitable means.

The mixing comprise any suitable processing additive based on a mineral oil, a synthetic oil, or a vegetal oil. As for example of synthetic or vegetable processing additive, said processing additive is selected from the group consisting of citrates, cyclohexane diesters, benzoates, adipates, phosphonates, polyethylene glycols, sunflower oil, linseed oil, and derivatives of castor oil, or a mixture thereof.

As shown in table 2, the presence of an processing additive, for example linseed oil, for example between 0.25 and 2% wt, enables to increase the flexibility of the sheet comprising acid based polymer without neutralising agent.

TABLE 2

Effect of the processing additive on the sheet properties. All the components are given in percentage in weight of the total weight of the polymeric composition.

| | Compositions | | | | |
|---|---|---|---|---|---|
| EAA | 10 | 9.75 | 9.50 | 9.25 | 9.00 |
| processing additive (Linseed oil) | 0 | 0.25 | 0.50 | 0.75 | 1.00 |
| Filler (CaCO₃) | 90.00 | 90.00 | 90.00 | 90.00 | 90.00 |
| Properties | | | | | |
| Sheet thickness (mils) | 130.50 | 129.50 | 127.50 | 128.50 | 126.00 |
| Max load at break (psi) | 7.93 | 6.92 | 6.57 | 5.47 | 5.16 |
| Flexibility (inches) | 1.79 | 1.82 | 1.89 | 2.09 | 2.05 |

However, this effect is also achieved for a sheet comprising acid based polymer neutralized or partially neutralized by a neutralising agent (data not shown).

To initiate the mixing, the polymeric composition may comprise a mixing additive. It may be any mixing additive suitable. Preferably, the mixing additive is an EAA polymer having a very high melt flow index preferably a melt flow index, measured at 190° C. under 2.16 kg load, of between 300 and 1700 g/10 min. The mixing additive may represent up to 1% wt of the total weight of the composition. The mixing additives may include tackifier resins known in the art.

The polymeric composition may comprise any suitable filler. The filler may be any ground minerals. For example, it may be kaolin, silica and/or calcium carbonate.

The filler, or mixture of fillers, may represent between 60 and 92% wt of the total weight of the polymeric composition.

Preferably, the filler, or mixture of fillers, is mixed with at least the acid-based polymer, the neutralizing agent and the processing additive, to obtain the polymeric composition.

The polymeric composition may also comprise a release agent. The release agent represents between 0.2 and 2.0% wt of the total weight of the polymeric composition. The release agent presents the advantage of enabling to work with lower levels of neutralisation of the acid-based polymer or copolymer and obtain an excellent extraction from the hot calendar rolls. As a consequence of the use of a release agent, the lower level of neutralisation results in improved flexibility of the sheet at room temperature.

The polymeric composition may also further comprise any suitable pigment or mixture of pigment. Preferably, the pigment represents between 0.5 and 5% wt of the total weight of the polymeric composition.

Examples of polymeric compositions without neutralizing agent are given in table 3.

TABLE 3

Examples of polymeric compositions without neutralizing agent. All the components are given in percentage in weight of the total weight of the polymeric composition.

| | Composition | | | | |
|---|---|---|---|---|---|
| | 1 | 2 | 3 | 4 | 5 |
| EAA-1 | 8.0 | | | | |
| EAA-2 | | 8.0 | | | |
| EMA-1 | | | 8.0 | | |
| EAA-3 | | | | 8.0 | 20.20 |

TABLE 3-continued

Examples of polymeric compositions without neutralizing agent. All the components are given in percentage in weight of the total weight of the polymeric composition.

| | Composition | | | | |
|---|---|---|---|---|---|
| | 1 | 2 | 3 | 4 | 5 |
| Processing additive | 2.5 | 2.5 | 2.5 | 2.5 | 2.40 |
| Mixing additive | 1.0 | 1.0 | 1.0 | 1.0 | |
| Release agent | 1.5 | 1.5 | 1.5 | 1.5 | 1.44 |
| Filler | 86.0 | 86.0 | 86.0 | 86.0 | 75.00 |
| Pigment | 1.0 | 1.0 | 1.0 | 1.0 | 0.96 |

Examples of polymeric compositions according to the invention are given in tables 4 and 5.

TABLE 4

Examples of polymeric compositions according to the invention. All the components are given in percentage in weight of the total weight of the polymeric composition.

| | Composition | | | | | | | |
|---|---|---|---|---|---|---|---|---|
| | 6 | 7 | 8 | 9 | 10 | 11 | 12 | 13 |
| EAA-1 | 8.0 | | | | | | | |
| EAA-2 | | 8.0 | | | | | | |
| EMA-1 | | | 8.0 | | | | | |
| EAA-3 | | | | 8.0 | 8.0 | 8.0 | 8.0 | 8.0 |
| Fatty acid salt | 1.0 | 1.0 | 1.0 | 0.5 | 1.0 | 2.0 | 3.0 | 5.0 |
| Processing additive | 2.5 | 2.5 | 2.5 | 2.5 | 2.5 | 2.5 | 2.5 | 2.5 |
| Mixing additive | 1.0 | 1.0 | 1.0 | 1.0 | 1.0 | 1.0 | 1.0 | 1.0 |
| Release agent | 1.5 | 1.5 | 1.5 | 1.5 | 1.5 | 1.5 | 1.5 | 1.5 |
| Filler | 85.0 | 85.0 | 85.0 | 85.5 | 85.0 | 84.0 | 83.0 | 81.0 |
| Pigment | 1.0 | 1.0 | 1.0 | 1.0 | 1.0 | 1.0 | 1.0 | 1.0 |

TABLE 5

Examples of polymeric compositions according to the invention. All the components are given in percentage in weight of the total weight of the polymeric composition.

| | Composition | | | | | | | |
|---|---|---|---|---|---|---|---|---|
| | 14 | 15 | 16 | 17 | 18 | 19 | 20 | 21 |
| EAA-3 | 3.03 | 15.15 | 10.10 | 5.05 | 3.03 | 3.03 | 3.03 | 3.03 |
| Ionomer-1 | 17.17 | | | | | | | |
| Ionomer-2 | 0.00 | 5.05 | 10.10 | 15.15 | 17.17 | 17.17 | 17.17 | 17.17 |
| Processing additive | 2.40 | 2.40 | 2.40 | 2.40 | 2.40 | 2.40 | 2.40 | 2.40 |
| Release agent-1 | 1.44 | 1.44 | 1.44 | 1.44 | 1.44 | | | |
| Release agent-2 | | | | | | 1.44 | | |
| Release agent-3 | | | | | | | 1.44 | |
| Release agent-4 | | | | | | | | 1.44 |
| Filler | 75.00 | 75.00 | 75.00 | 75.00 | 75.00 | 75.00 | 75.00 | 75.00 |
| Pigment | 0.96 | 0.96 | 0.96 | 0.96 | 0.96 | 0.96 | 0.96 | 0.96 |

In the examples, EAA-1 and EAA-3 have an acid content of around 10% wt, EAA-2 around 15% wt, EMA-1 around 19% wt.

EAA-1 is Primacor 3460 from Dow Chemical, EAA-2 is Escor 5200 from ExxonMobil Chemical Company or Nucrel® 2806 from DuPont, EAA-3 is Bynel® 2002 or Bynel® 2022 from DuPont. EMA-1 is Nucrel® 2906 from DuPont.

The neutralization agent is a fatty acid salt, it is a Zn Octoate, for example Plastistab 2275 from Halstab, but it may also be a Zn Stearate, for example Coad® 21 Zn Stearate from Norac, a Zn Resinate, for example Plastistab 2280 from Halstab, Ca octacosanoate, for example Licomont CaV 102 from Clariant, or a copolymer in a form of an ionomer, for example ionomer-1 is Surlyn® 9320 from DuPont and ionomer-2 is Surlyn® 9020 from DuPont, but it may also be Iotek 4200 or Iotek 7010 or Iotek 8020 from Exxon.

The processing additive is STL 24 (Linseed Oil) from St. Lawrence Chemicals or DINCH from BASF, it may also be Citrofol® AHII from Jungbunzlauer, STL 130 (Sunflower oil) from St. Lawrence Chemicals, Benzoflex® 9-88 from Genovique, Soft-N-Safe from Danisco, Plastol 545 from Esso, or Drakeol® 600 from Penreco.

The mixing additive is an EAA or an EMA polymer having a very high melt flow index, preferably a melt flow index, measured at 190° C. under 2.16 kg load, of between 400 and 1500 g/10 min. In the examples, it is Nucrel® 599 from DuPont, or Primacor 5990 from Dow Chemical.

The release agent −1 is a copolymer having acid groups, for example BYK P4100 from BYK Chemie. The release agent −2 is a high molecular, multi-functional, fatty acid ester, for example Loxiol® G70S from Oleo Chemicals. The release agent −3 is a polyethylene polar wax, for example Licowax PED 153 from Clariant. The release agent −4 is stearic acid, for example Emery 400 from Brenntag.

The filler is calcium carbonate.

The pigment loading is a combination of any required pigments to attain a desired colour and visual. Pigment loading is normally about 1% by weight of the starting point materials.

The mixing performances, and the processing into a sheet at around 3.175 mm (125 mils) or around 0.635 mm (25 mils), were assessed and the results are given in tables 6 to 8. The appearance of the sheet was considered "excellent", and was noted "5", if the sheet that was extracted is uniform and free of defects, and was considered "poor", and noted "1", if the extracted sheet is not uniform and has defects such as wrinkles, creases, waves, holes, and so forth. It should be noted that sufficient material needs to be on the mill such that there is an excess in the nip so as to achieve a mixing condition. The release from the calender rolls was also evaluated by noting the ease with which the sheet was extracted from the hot calender. Particularly for the processing of a 25 mils sheet, the hot strength was evaluated by the effect on the sheet of a pulling force. An excellent result was noted if the sheet resisted the pulling action and if it did not elongate based on this said pull. A poor result was noted if the sheet elongated and if it would tear easily. The sheet quality was evaluated as previously described for thick sheet appearance. The appearance of the calender rolls was evaluated visually by noting the amount of residue remaining on the roll after the sheet was extracted. For all evaluations, a note has been given, "5" meaning "excellent" and "1" meaning "poor".

TABLE 6

Evaluation of the compositions from table 3.

| | Compositions | | | | |
|---|---|---|---|---|---|
| | 1 | 2 | 3 | 4 | 5 |
| Mixing | | | | | |
| Drop temperature (° F.) | 295 | 280 | 300 | 290 | 315 |
| Mixing time (sec) | 70 | 60 | 70 | 60 | 60 |
| Mix quality | 5 | 5 | 5 | 5 | 4 |
| Filler incorporation | 5 | 5 | 5 | 5 | 4 |
| Sheeting at 125 mils (3.175 mm) | | | | | |
| Appearance | 2.5 | 3 | 3.5 | 3.5 | 1 |
| Release from calender rolls | 2.5 | 1 | 1.5 | 1 | 1 |
| Sheeting at 25 mils (0.635 mm) | | | | | |
| Release from calender rolls | 2 | 1 | 1 | 1 | 1 |
| Hot strength | 1 | 1.5 | 1 | 0.5 | 1 |
| Sheet quality | 1.5 | 1 | 1.5 | 1 | 1 |
| Appearance of calender rolls | 1 | 1 | 1 | 1 | 1 |

TABLE 7

Evaluation of the compositions from table 4.

| | Compositions | | | | | | | |
|---|---|---|---|---|---|---|---|---|
| | 6 | 7 | 8 | 9 | 10 | 11 | 12 | 13 |
| Mixing | | | | | | | | |
| Drop temperature (° F.) | 318 | 340 | 324 | 303 | 348 | 340 | 310 | 310 |
| Mixing time (sec) | 85 | 70 | 80 | 60 | 60 | 60 | 65 | 80 |
| Mix quality | 5 | 5 | 5 | 5 | 5 | 5 | 5 | 5 |
| Filler incorporation | 5 | 5 | 5 | 5 | 5 | 5 | 5 | 5 |
| Sheeting at 125 mils (3.175 mm) | | | | | | | | |
| Appearance | 2 | 2 | 3 | 5 | 5 | 5 | 5 | 5 |
| Release from calender rolls | 5 | 5 | 5 | 3.5 | 5 | 5 | 5 | 5 |
| Sheeting at 25 mils (0.635 mm) | | | | | | | | |
| Release from calender rolls | 5 | 5 | 5 | 2.5 | 5 | 5 | 5 | 5 |
| Hot strength | 5 | 5 | 4 | 2.5 | 5 | 5 | 5 | 5 |
| Sheet quality | 4 | 5 | 5 | 4 | 5 | 5 | 5 | 5 |
| Appearance of calender rolls | 5 | 5 | 5 | 2.5 | 5 | 5 | 5 | 5 |

TABLE 8

Evaluation of the compositions from table 5.

| | Compositions | | | | |
|---|---|---|---|---|---|
| | 14 | 15 | 16 | 17 | 18 |
| Mixing | | | | | |
| Drop Temperature (° F.) | 320 | 330 | 355 | 375 | 377 |
| Mixing time (sec) | 90 | 70 | 70 | 75 | 85 |
| Mix quality | 4 | 5 | 5 | 5 | 5 |
| Filler incorporation | 4 | 5 | 5 | 5 | 5 |
| Sheeting at 125 mils (3.175 mm) | | | | | |
| Appearance | 5 | 5 | 5 | 5 | 5 |
| Release from calender rolls | 4 | 1.5 | 3 | 4.9 | 4.8 |
| Sheeting at 25 mils (0.635 mm) | | | | | |
| Release from calender rolls | 5 | 1.5 | 3.5 | 5 | 5 |
| Hot strength | 5 | 1.5 | 3.5 | 5 | 5 |
| Sheet quality | 5 | 4 | 4 | 5 | 5 |
| Appearance of calender rolls | 5 | 1 | 3.5 | 5 | 5 |

TABLE 9

Evaluation of the compositions from table 5.

| | Compositions | | |
|---|---|---|---|
| | 19 | 20 | 21 |
| Mixing | | | |
| Drop Temperature (° F.) | 368 | 363 | 347 |
| Mixing time (sec) | 65 | 65 | 115 |
| Mix quality | 4 | 4.5 | 3.5 |
| Filler incorporation | 4 | 4.5 | 4 |
| Sheeting at 125 mils (3.175 mm) | | | |
| Appearance | 4 | 4.5 | 2.5 |
| Release from calender rolls | 4 | 4 | 1.5 |
| Sheeting at 25 mils (0.635 mm) | | | |
| Release from calender rolls | 4 | 4.5 | 3 |
| Hot strength | 5 | 4.5 | 4 |
| Sheet quality | 5 | 5 | 4 |
| Appearance of calender rolls | 3.5 | 4.5 | 3 |

An example of a production line of the surface covering according to the invention is given at FIG. 1.

The polymeric composition, coming from one or several feeders 4, is processed to form a polymeric sheet using a sheet production device 5, said sheet production device 5 being any suitable means as the polymeric composition enables to use any conventional equipment used to produce vinyl-based surface coverings. The polymeric particles is processed using a calendering device 1 comprising sheet production device 5, but they may also be produced by extrusion of the polymeric composition into a sheet that is IR re-heated then calendered to the final gauge.

The polymeric sheet obtained may be used as a single sheet flooring, or may be used as a substrate, or a component, of a multiple layer surface covering. The multiple layer surface covering may comprise the polymeric sheet obtained according to the invention and at least a second sheet, said second sheet being either a second polymeric sheet obtained according to the invention or any suitable sheet. Preferably, the surface covering is a floor covering.

The polymeric sheet may be granulated, using any suitable shredder 6, and screened into particles of known average size and distribution, and having any suitable form. The polymeric particles may be shreds, crumbs, chips, flakes, pebbles, granules or a mix thereof. The polymeric composition has the advantage of being enable to be ground and cut using conventional devices. For this purpose, the polymeric sheet is manufactured then granulated into particles which are passed through a sieve of between around 1 mm (39 mils) and 25 mm (985 mils) according to decoration objectives. The polymeric particles are then sent, for example using hoppers 7, to at least one feeder 8 of a belt press device 2, said belt press device 2 comprising a band-shape carrier 9 and calender rolls 10.

The polymeric particles obtained can either be dispersed onto the surface of a substrate prior to the sheet calendering, the substrate being either a polymeric sheet as described or another type of polymeric sheet, or the polymeric particles can be introduced into the extrusion step with the polymeric composition coming out of the mixer to form a multicoloured particles pattern.

The polymeric particles are deposited onto a band-shape carrier 9, eventually on a substrate laid on said band-shape carrier 9, then they are heated prior being heat-pressed using any suitable device. Sufficient pre-heating, for example at a temperature of around 204° C. (around 400° F.), is done onto the polymeric particles so as to obtain a constant temperature throughout the mass. In the heating press, the assembled hot polymeric particles are pressed under heat, for example 30 to 50 seconds, preferably 40 seconds, between 193 and 221° C. (380 and 430° F.), preferably around 204° C. (around 400° F.), so as to unify all of the polymeric particles into a continuous surface covering of constant integrity. This surface covering can then be allowed to air cool without pressure or press cooled by using a cooling segment of the press device.

The polymeric particles, deposited on the band-shape carrier 9, or on a substrate, are either of at least one single colour or different single colours, but they may also be multicolour particles.

In the embodiment of polymeric particles of different single colours, the particles are preferably premixed into a homogeneous mixture before being distributed on the band-shape carrier 9, using the feeder 8, in one step or in multiple steps. In a multiple steps particles deposition, the distribution in particles size and/or colour may be different in one step from another step, using several feeders 8, so that the particles are deposited on different layers of different particle size and/or colour.

The resulting substrate-free surface covering may be then gauged to the required final thickness by sanding the back of the surface covering through the use of a sanding device 3. The residual material from the sanding step may be then send, using waste return devices 11, to a feeder 8, to be deposited onto the band-shape carrier 9 and therefore to be used as a substrate onto which the polymeric particles are deposited.

The gauged surface covering may be then mechanically embossed if desired, by any suitable means, the mechanical embossing being textured or not depending on the desired visual. The embossing may be performed at a temperature between 115 to 138° C. (240 to 280° F.), preferably around 126° C. (around 260° F.). A varnish layer, for example a urethane-based varnish coating can further be applied and cured onto the surface of the surface covering.

The surface covering may be then cut into tiles of dimension that is slightly greater than the final required tile size. These oversized tiles are then annealed in an oven, for example at a temperature between 70 and 110° C. (158 and 230° F.), preferably 85 and 95° C. (185 and 203° F.), so as to remove stress induced during the manufacturing process. This results in shrinkage of the tile size. The tiles are then cooled, for example to a temperature between 26 and 35° C. (79 to 95° F.), preferably around 28° C. (around 82° F.), and cut into their final size, for example in tiles of 12"×12".

The specifications of an example of a so-called "homogenous" surface covering, or substrate-free polymeric covering, produced according the present invention are given in table 9.

TABLE 10

|  |  | Results | specs |
|---|---|---|---|
| Total Thickness | 100 Mils | | |
| References | ASTM F1066/ASTM F1700/ASTM F1344 | | |
| Reaction to Fire | ASTM E648 > 0.45 watts/cm$^2$ | (>1.1) | >0.45 |
|  | ASTM E662 Smoke Density | (173/135) | <450 |
|  | Surface Burning (CAN/ULC S102.2 | (4/18) | <300 |
| Slip resistance | ASTM D2047 | 0.62 | ≥0.5 |
|  | ASTM C1028 Dry | 0.97 | ≥0.5 |
|  | ASTM C1028 Wet | 0.94 | ≥0.5 |
| Static Load limit | ASTM F970 @ 250 PSI | 0.001" | ≤0.005" |
|  | ASTM F970* @ 800 PSI (using 0.56 foot) | 0.002" | ≤0.005" |
|  | ASTM F970* @2000 PSI ((using 0.25 foot)) | 0.005" | ≤0.005" |
| Acoustical Testing | ISO140-8 | ΔLw: 3 dB Low | |
|  | NF S31 074 | Lnew = 78 dB OK | |
|  | ISO 354 | αw = 0.05 OK | |
| Floorscore | SCS-EC10.2-2007 | Certified | |
| Size | ASTM F2055 | −0.005 | ±0.016" |
| Thickness | ASTM F386 | 0.001" | ±0.005" |
| Resistance to Heat | ASTM F1514 | ΔE = 2.32 | ΔE < 8 |
| Resistance to Light (300hres) | ASTM F1515 | ΔE = 1.75 | ΔE < 8 |

TABLE 10-continued

|  |  | Results | specs |
|---|---|---|---|
| Residual Indentation | ASTM F1914 (McBurney) @25° C. 1 MIN | 0.006" | 0.006" to 0.015" |
|  | ASTM F1914 (McBurney) @25° C. 10 MIN | 0.010" | 0.010" max |
|  | ASTM F1914 (McBurney) @77° C. 30 s | 0.003" | <0.032" |
| Deflection | ASTM F1304 | ≥1" | Min 1" |
| Impact | ASTM F1265 | Pass | 4 drops from 20" |
| Dimensional Stability | ASTM F2199 | 0.005" | 0.024" |
| Flexibility (Mandrel test) | ASTM F137 | Breaks 1" | no Breaks 1" |
| Hardness | ASTM D2240 Shore A | 100 | >85 |
| Abrasion Resistance | ASTM D3389 | 0.6134gr | <1gr/1000 cycles |
| Quality of cut | ASTM F511 | 0.0003" | 0.005" |
| Resistance to chemicals | ASTM F925 |  |  |
|  | White Vinegar 5% | slight change | slight change |
|  | Rubbing Alcohol 5% | No effect | slight change |
|  | White Mineral oil | No effect | slight change |
|  | Sodium Hydroxide 5% | slight change | slight change |
|  | Hydrochloric acid 5% | slight change | slight change |
|  | Household amonia 5% | No effect | slight change |
|  | Household bleach 5.25% | No effect | slight change |
|  | Disinfectant-phenol type | No effect | slight change |
|  | Unleaded gasoline | No effect | slight change |

KEYS

1: polymeric particles device
2: belt press device
3: sanding device
4: feeders of the
5: sheet production device
6: shredder
7: hoppers
8: feeder of the belt press device
9: band-shape carrier
10: calender rolls
11: waste return devices

The invention claimed is:

1. A method to produce a polymeric surface covering, said method comprising the steps of:
   providing an acid-based polymer;
   providing a neutralizing agent selected from the group consisting of an organic metallic compound, a metallic salt of a fatty acid, and a terpolymer ionomer, or a mixture thereof;
   providing a processing additive;
   mixing said acid-based polymer, said neutralizing agent and said processing additive, to obtain a polymeric composition;
   processing said polymeric composition to form a polymeric sheet;
   granulating said polymeric sheet into polymeric particles;
   depositing said polymeric particles on a band-shape moving carrier of a belt press device;
   heating the polymeric particles on said band-shape moving carrier;
   pressing under heat the polymeric particles to form said polymeric surface covering,
   further comprising the steps of:
   sanding the back of said polymeric surface covering;
   mechanically embossing the top of said surface covering;
   coating the top of said surface covering with a varnish layer.

2. The method according to claim 1, wherein the organic metallic compound is selected from the group consisting of potassium hydroxide, aluminum hydroxide, calcium hydroxide, and zinc oxide, or a mixture thereof.

3. The method according to claim 1, wherein the metallic salt of a fatty acid has between 8 and 28 atoms of carbon.

4. The method according to claim 1; wherein the terpolymer ionomer is of ethylene, butylacrylate and methacrylic acid.

5. The method according to claim 1, wherein the neutralizing agent is a mixture comprising a metallic salt of a fatty acid having between 8 and 28 atoms of carbon and an ionomer.

6. The method according to claim 1, wherein the processing additive is a mineral oil, a vegetable oil or a synthetic oil.

7. The method according to claim 1, wherein the processing additive comprises a processing additive selected from the group consisting of citrates, cyclohexane diesters, benzoates, adipates, phosphonates, polyethylene glycols, sunflower oil, linseed oil, and derivatives of castor oil, or a mixture thereof.

8. The method according to claim 1, wherein the acid-based polymer is an ethylene-co-acrylic acid polymer (EAA) or an ethylene-co-methacrylic acid polymer (EMAA).

9. The method according to claim 1, further comprising the steps of providing an additive selected from the group consisting of a filler, a release agent, and a pigment, or a mixture thereof, and introducing said additive in the mixing step.

10. The method according to claim 1, wherein the processing of the polymeric composition, to form a polymeric sheet, is performed by calendering or by extrusion.

11. The method according to claim 1, further comprising the steps of:
   cutting the polymeric surface covering into tiles, and annealing said tiles.

12. The method according to claim 1, wherein the surface covering is a floor covering.

* * * * *